(12) United States Patent
Burns

(10) Patent No.: US 7,658,449 B2
(45) Date of Patent: Feb. 9, 2010

(54) SAFETY RESTRAINT FOR A VEHICLE

(76) Inventor: Dave Burns, P.O. Box 522, Woodacre, CA (US) 94973

( * ) Notice: Subject to any disclaimer, the term of this patent is extended or adjusted under 35 U.S.C. 154(b) by 771 days.

(21) Appl. No.: 10/749,065

(22) Filed: Dec. 31, 2003

(65) Prior Publication Data
US 2007/0152493 A1     Jul. 5, 2007

(51) Int. Cl.
*A62B 35/00*     (2006.01)
(52) U.S. Cl. .................. 297/465; 297/466; 297/485; 297/487
(58) Field of Classification Search ............. 297/465, 297/466, 485, 487; 280/801.1, 748, 749; 5/424, 118
See application file for complete search history.

(56) References Cited

U.S. PATENT DOCUMENTS

| 4,143,914 | A | * | 3/1979 | Klich | 297/465 |
| 4,630,324 | A | * | 12/1986 | Fligsten et al. | 5/94 |
| 5,375,879 | A | * | 12/1994 | Williams et al. | 280/749 |
| 5,529,341 | A | * | 6/1996 | Hartigan | 280/749 |
| 5,536,042 | A | * | 7/1996 | Williams et al. | 280/749 |
| 5,660,445 | A | * | 8/1997 | Murray | 297/485 |
| 5,727,814 | A | * | 3/1998 | White | 280/748 |
| 6,367,839 | B1 | * | 4/2002 | Langhoff | 280/751 |
| 6,612,606 | B1 | * | 9/2003 | Bergenheim et al. | 280/728.1 |
| 7,243,950 | B2 | * | 7/2007 | Kooter Lenders | 280/808 |

\* cited by examiner

*Primary Examiner*—Laurie K Cranmer

(57) ABSTRACT

Child restraint for a vehicle with a rectangular flexible sheet, a pair of attachment rings, a mating device, a seatbelt mating device, and a rigidifying strip. The attachment rings are attached to one edge of the flexible sheet so that the rings align with the back seat center and either right or left female seatbelt buckles found in most passenger cars. The seatbelt mating device capable of structurally uniting the right and left shoulder harnesses in the middle of the backrest in cars without center shoulder harnesses. The rectangular sheet having a mating device that attaches to the male buckle of the either the right or left shoulder harness which is held in the middle of the backrest by the seatbelt mating device, so that the sheet wraps around the child thereby restraining him or her during an accident or sudden deceleration

1 Claim, 4 Drawing Sheets

_US 7,658,449 B2_

SAFETY RESTRAINT FOR A VEHICLE

CROSS REFERENCE TO RELATED APPLICATIONS

Not Applicable

STATEMENT REGARDING FEDERALLY SPONSORED RESEARCH OF DEVELOPMENT

Not Applicable

BACKGROUND OF THE INVENTION

This invention relates generally to the field of vehicle passenger safety restraint devices, and specifically to a child restraint for a vehicle.

Various types of vehicle seat safety restraints are well known. Generally, they consist of some combination of adjustable straps and buckles which secure the user's hips, waist, and shoulders thereby preventing the wearer from lurching forward during a quick stop or an accident where the vehicle decelerates quickly.

In recent years, specialized infant and child safety seats have been designed and marketed which attach to the standard seatbelts found in vehicles. These products feature their own means of restraining an infant or small child more effectively during travel.

There is, however, one condition for which currently known products fail to account. This is when a child between the ages of approximately seven and adolescence falls asleep lying down in the back seat of a standard motor vehicle such as an automobile or an SUV. In these cases the child, who has outgrown the legal requirement to be placed in a car seat or booster, remains strapped into the standard waist belt but assumes a supine position out of the shoulder belt, and therefore with no protection against the sudden acceleration of the upper body relative to the inside of the car that can occur in a sudden stop or an accident.

In a study by the National Safety Transportation Board, it was determined that children improperly restrained by standard belt restraints were more likely to be fatally, critically, or seriously injured in an accident then those riding completely unrestrained.

BRIEF SUMMARY OF THE INVENTION

The primary object of the invention is to provide a supplemental safety restraint for a vehicle which allows a child, adolescent, or young adult to be dependably restrained while lying down in a back seat of a vehicle.

Another object of the invention is to provide a supplemental safety restraint for a vehicle that makes use of the existing seat belt hardware within the vehicle.

Another object of the invention is to provide a supplemental safety restraint for a vehicle which allows the child to be restrained in a supine position while wearing a conventional seatbelt.

A further object of the invention is to provide a safety restraint for a vehicle that allows a passenger in the front seat of the vehicle to easily reach back and engage the safety restraint.

Another object of the invention is to provide a safety restraint for a vehicle that restrains the child from being thrown forward during an accident or sudden deceleration.

Another object of the invention is provide a safety restraint for a vehicle which is inexpensive to manufacture.

Other objects and advantages of the present invention will become apparent from the following descriptions, taken in connection with the accompanying drawings wherein, by way of illustration and example, an embodiment of the present invention is disclosed.

The preferred embodiment of the invention is a safety restraint for a vehicle which includes, but is not limited to the following: A rectangular flexible sheet, a pair of attachment rings, an attachment buckle, a seatbelt locking clip, a seatbelt mating device a rigid tying strip, said pair attachment rings fixed to one edge of said flexible sheet so that said rings align with the back seat seatbelt buckles found in most passenger vehicles, and a standard seatbelt locking clip, a seatbelt mating device having the means of structurally uniting the right and left shoulder straps found in the backseats of most passenger cars in the event that there is not a center shoulder belt, said rectangular flexible sheet having a mating buckle or clip centrally attached that is capable of mating with a standard male vehicle safety belt buckle.

A BRIEF DESCRIPTION OF THE DRAWINGS

The drawings constitute a part of this specification and include exemplary embodiments to the invention, which may be embodied in various forms. It is to be understood that in some instances, various aspects of the invention may be shown exaggerated or enlarged to facilitate an understanding of the invention FIG. 1 is a perspective view of a standard back seat of a motor vehicle.

A DETAILED DESCRIPTION OF THE PREFERRED EMBODIMENTS

Detailed description of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, or manner.

Figure 1:
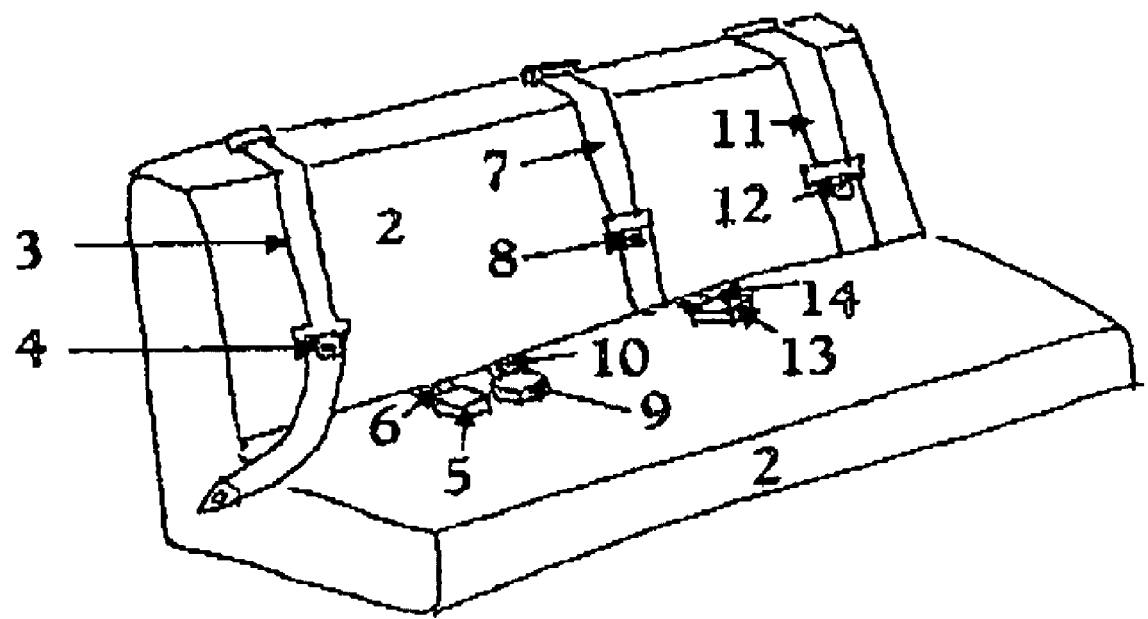

Referring now to FIG. 1 we see a perspective view of a standard back seat (2) of a passenger car. These seats typically have three sets of seat belts. They consist of a left shoulder harness (3), male mating hardware (4), a female buckle (5) and strap (6), a center shoulder harness (7) mate mating hardware (8), female buckle (9), and buckle strap (10), and a right shoulder harness (11), male mating hardware (12), female buckle (13), and buckle strap (14)

Figure 2:
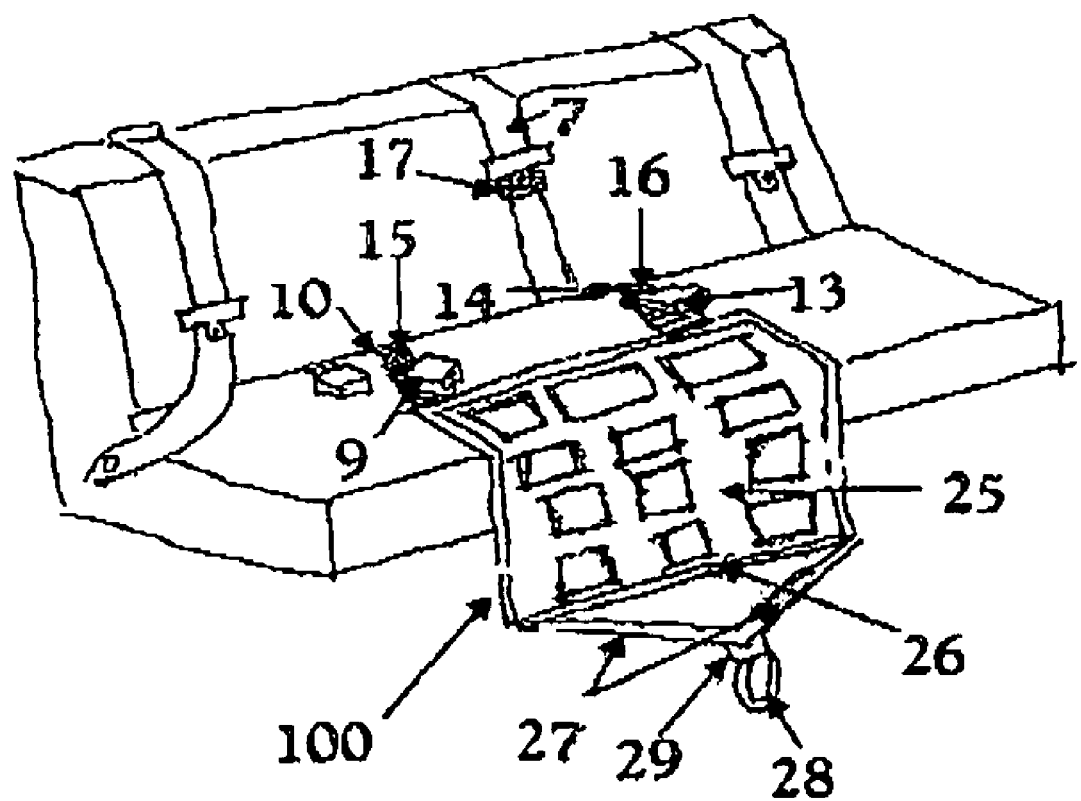
FIG. 2 is a perspective view of the back seat with the present invention in place.

FIG. 2 shows the present invention (100) in place on the back seat (2) of the vehicle. A flexible, rectangular sheet (25) of material such as ballistic nylon or the like has a pair of attachment rings (15, 16) attached to the edge of the sheet (25) so that the rings can engage the straps (10, 14) behind the female buckles (9, 13) These rings (15, 16) are sufficiently small so as not to be able to slide up the straps (10, 14) and over the buckles (9, 13). These rings (15, 16) can be in the style of standard carabiners or any other assembly or item that allows the user to fasten the sheet (25) behind the buckles (9, 13) in a way in which these items or assemblies will not slide past the buckles (9, 13). The sheet (25) also includes a rigidifying strip (26) along the parallel edge opposite the attachment rings (15, 16) A buckling assembly is attached to this strip (26) consisting of nylon webbing (27) sewn in such a way as to incorporate a carabiner type locking ring (28), or any other assembly or item which will reliably attach itself to the male mating hardware (5) of the center shoulder harness, and adjustment hardware (29) through which the webbing (27) might be pulled to adjust the position of the carabiner (28) relative to the rigidifying strip (26) is such a way that users of different sizes could be accommodated. A standard seat belt locking clip (17) holds the male mating hardware (8) of the center shoulder harness in the optimal position for ease of attachment with the carabiner (28). This clip (17) can also be moved up and down the harness (7) to accommodate users of different sizes.

Figure 3:
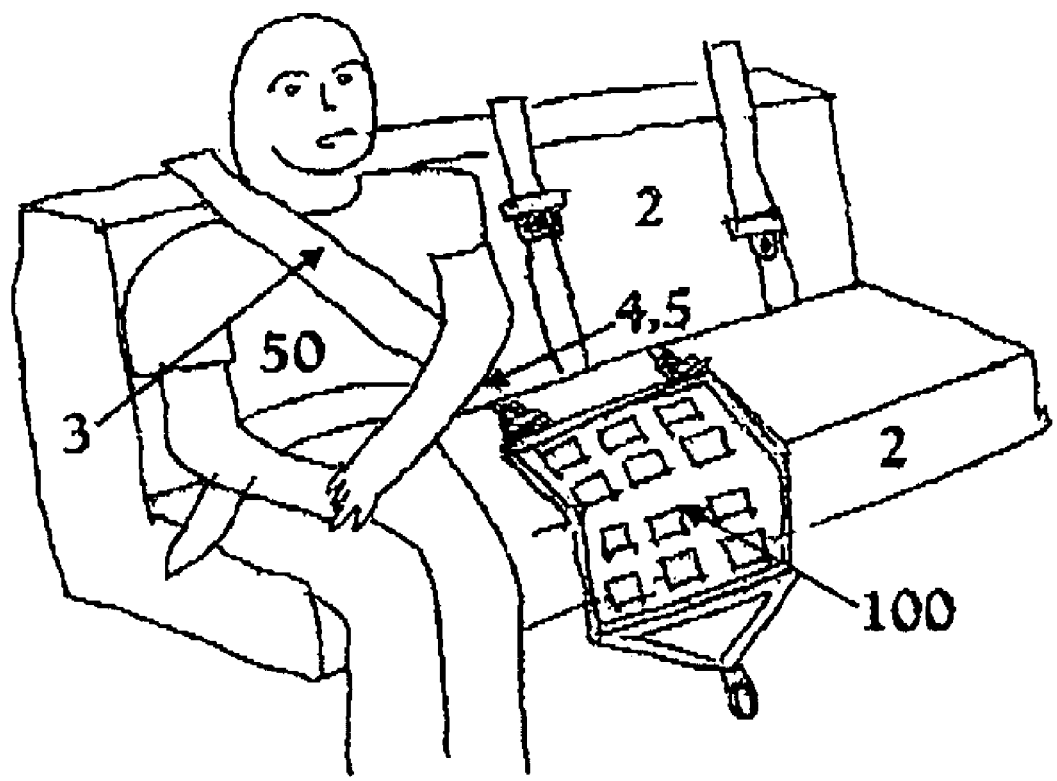
FIG. 3 is a perspective view of a child sitting next to the present invention.

FIG. 3 shows a child (50) between the ages of six and adolescence being restrained by a standard left-side seatbelt assembly (3, 4, 5) of the back seat (2) of a car. The present invention (100) rests on the seat (2) next to the child (50)

Figure 4:
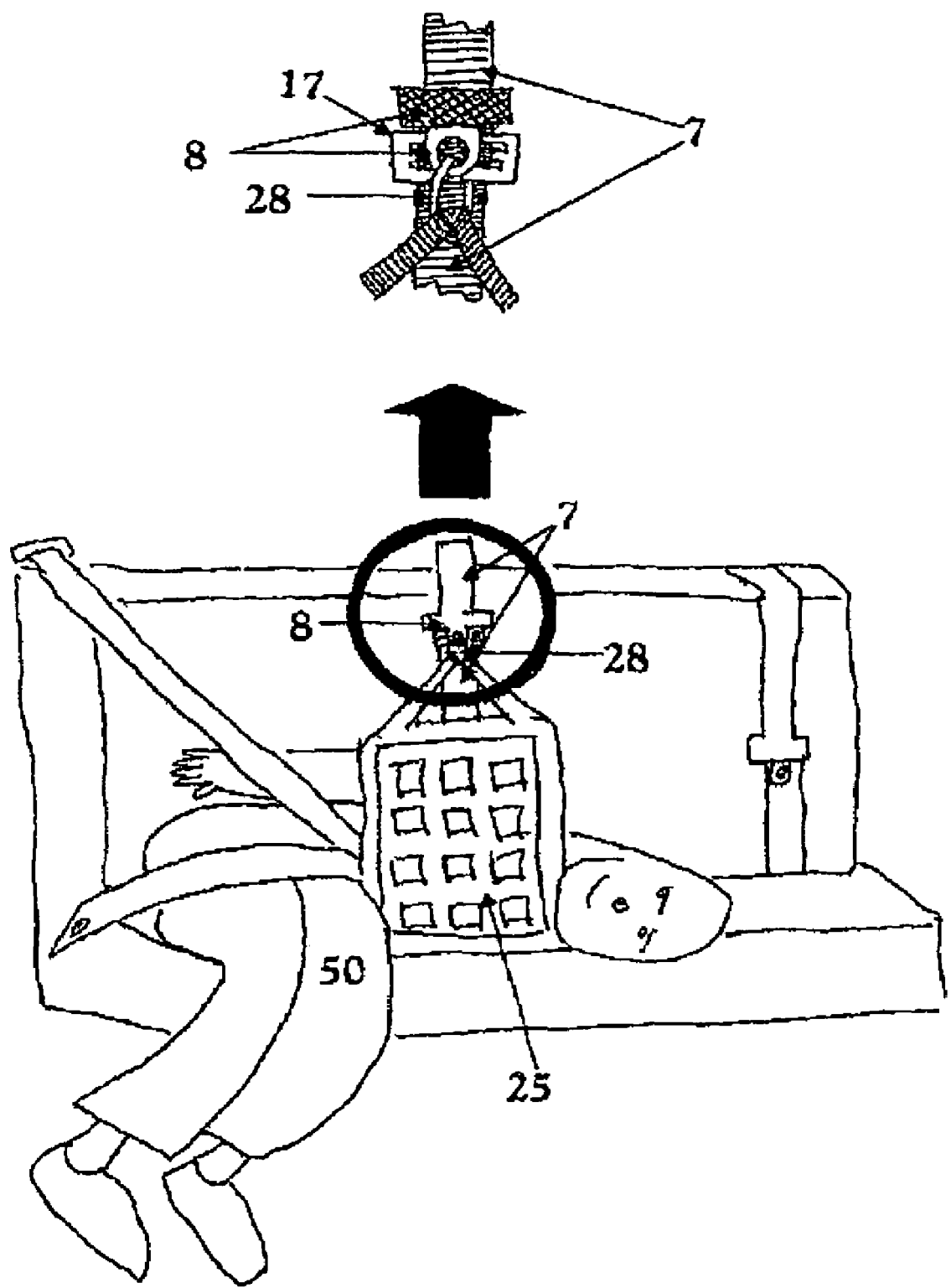
FIG. 4 is a perspective view of a child restrained by the present invention

FIG. 4 shows the present invention in use The sheet (25) is wrapped around the child (50). The carabiner (28) is locked through the hole in the center shoulder harness' male mating hardware (8). This way, the child (50) is safely and dependably restrained from accelerating forward relative to the vehicle while lying in the supine position. The location of the carabiner (28) and the male mating hardware (8) of the center shoulder harness (7) are fixed by the standard seatbelt locking clip (17) such that a passenger in the front seat can easily reach back and lock them together without the need to stop the vehicle. In this way, when a child falls asleep in the back seat of a vehicle, he or she may lie down comfortably in a supine position and be safely restrained by the use of the present invention.

FIG. 5 shows an alternate embodiment of the invention (200). A standard jumpsuit has been structurally reinforced with straps (210, 212), and fitted with mating hardware (202, 204) is such a way as to lock the child into the existing seatbelt hardware in a most passenger vehicles while the child is in a supine position. In this way, a child may lie down in the back seat of a passenger vehicle, and be safely restrained by existing hardware from sudden acceleration relative to the vehicle in the event of an accident or sudden stop.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A safety restraint for a vehicle, comprising:
a rectangular flexible sheet,
a lower, edge portion of said flexible sheet including two spaced attachment rings,
each of said attachment rings configured to be sufficiently small to engage respective straps behind female seatbelt buckles without sliding up the straps and over the buckles;
said flexible sheet including a rigidifying strip along a parallel edge thereof, opposite said two attachment rings;
a buckling assembly attached to said rigidifying strip and including one attachment ring configured to engage with a male seatbelt buckle of a center shoulder harness; and
adjustment hardware for adjusting the position of the attachment ring included with said buckling assembly relative to said rigidifying strip.

* * * * *